United States Patent [19]

Moyer

[11] Patent Number: 5,205,075
[45] Date of Patent: Apr. 27, 1993

[54] GASKETS FOR SEALING A SPACE BETWEEN SURFACES AND CLIPS FOR MOUNTING GASKETS TO SURFACES

[75] Inventor: James D. Moyer, Downington, Pa.

[73] Assignee: The Bentley-Harris Manufacturing Company, Lionville, Pa.

[21] Appl. No.: 665,289

[22] Filed: Mar. 6, 1991

[51] Int. Cl.⁵ .............................................. E06B 7/16
[52] U.S. Cl. .................................. 49/493; 49/492.1; 49/498.1
[58] Field of Search ............... 49/493, 494, 485, 498, 49/492; 277/166, 181

[56] References Cited

U.S. PATENT DOCUMENTS

| | | |
|---|---|---|
| 2,060,353 | 11/1936 | Tea . |
| 2,102,392 | 12/1937 | Tea . |
| 2,121,854 | 6/1938 | Breer . |
| 2,121,893 | 6/1938 | Tea . |
| 2,139,329 | 12/1938 | Fessler . |
| 2,579,072 | 12/1951 | Harris . |
| 2,643,433 | 6/1953 | Scott . |
| 2,867,464 | 1/1959 | Crampton . |
| 2,938,249 | 5/1960 | Milne . |
| 2,988,788 | 6/1961 | Saponara . |
| 3,059,299 | 10/1962 | Sarafinas . |
| 3,167,824 | 2/1965 | Berwanger . |
| 3,167,826 | 2/1965 | Watzl et al. . |
| 3,977,125 | 8/1976 | Sudo ................................ 49/494 X |
| 4,538,381 | 9/1985 | Vogel .............................. 49/493 X |
| 4,783,087 | 11/1988 | DeCore et al. . |
| 4,822,060 | 4/1989 | Moyer et al. . |
| 4,986,033 | 1/1991 | Weil ................................. 49/492 |

FOREIGN PATENT DOCUMENTS

| | | | |
|---|---|---|---|
| 102604 | 12/1937 | Australia .......................... 49/492 |
| 855552 | 5/1940 | France ............................. 49/492 |
| 2491120 | 9/1980 | France . |

Primary Examiner—Philip C. Kannan
Attorney, Agent, or Firm—Synnestvedt & Lechner

[57] ABSTRACT

Woven tubular gaskets for sealing the space between an oven and oven door in a self-cleaning oven. A clip for securing an oven gasket to a surface on an oven comprises a shoulder for interfacing to the surface on the oven and securing the gasket to the surface, a first retaining member integrally formed on a first side of the shoulder for efficiently retaining the clip on the gasket, and a second retaining member integrally formed on a second side of the shoulder for further fixedly retaining the clip to the gasket. Oven gaskets described and claimed herein economically and efficiently seal the space between two surfaces and reduce the number of attaching clips necessary to securedly fix the gasket to the oven by providing mounting of the clips through a braided fiberglass sleeve and a knitted wire bulb of the gasket.

13 Claims, 2 Drawing Sheets

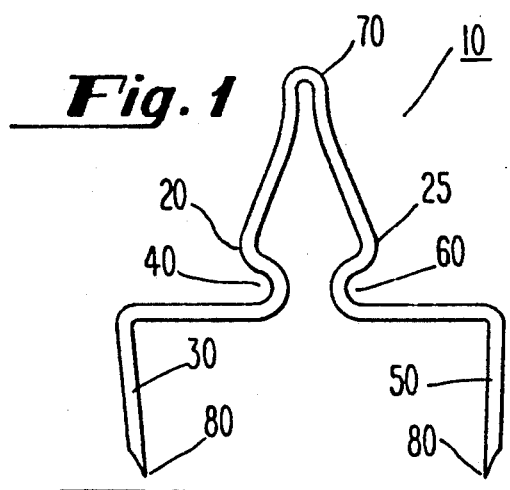
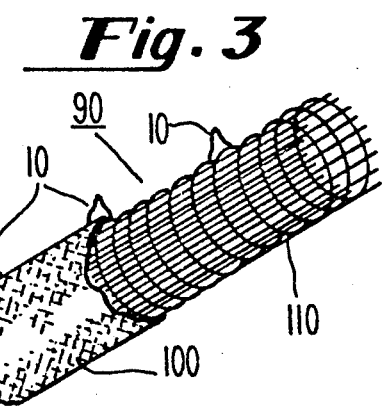
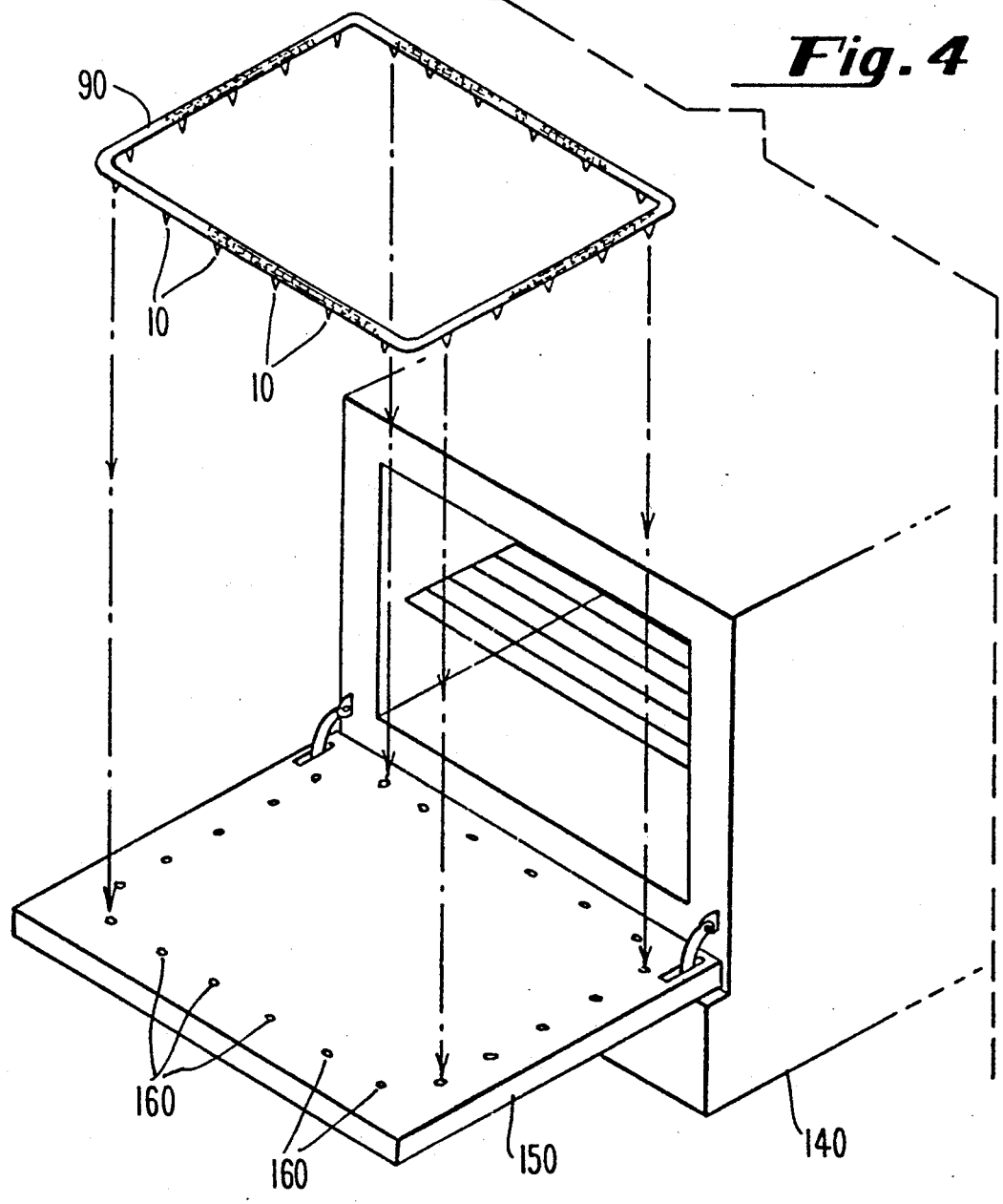

GASKETS FOR SEALING A SPACE BETWEEN SURFACES AND CLIPS FOR MOUNTING GASKETS TO SURFACES

FIELD OFF THE INVENTION

This invention relates generally to gaskets and the attachments thereof to surfaces and substrates. More particularly, this invention relates to woven tubular gaskets having individual attachment members.

BACKGROUND OF THE INVENTION

Articles and devices for providing a sealing arrangement between two surfaces are well known. Depending upon the particular type of seal which must be achieved and the environment in which the seal will operate, particular types of gaskets and seals have been developed to accomplish adequate sealing and to ensure that the outside environment does not impinge in the area which the seal is intended to protect. To accomplish these goals, prior seals and gaskets have generally been made up of a sealing strip and an attachment mechanism that is applied to the strip to ensure that the gasket or seal will adhere to a pair of surfaces and perform the sealing function.

Weather stripping is typical of the above-mentioned gasket arrangement for sealing a pair of surfaces. For example, weather stripping which is especially adapted for use on motor vehicles to seal the openings around doors and windows usually consists of tubular covers made of a soft material such as rubber, and a series of zigzag loops which are adapted to secure the rubber to the door or window of the car. See, e.g., Tea U.S. Pat. No. 2,060,353, Tea U.S. Pat. No. 2,102,392, Breer U.S. Pat. No. 2,121,854; and Tea U.S. Pat. No. 2,121,893. The aforementioned patents generally teach a number of zigzag loops which encircle a core that is inserted through the tubular rubber covering and a fabric or panel member that covers the tubular covering to provide a unitary structure. The zigzag loops are not secured to the core, but merely slip onto the core after they are bent into a particular arrangement for insertion into the tubular member.

Weather stripping as taught in the above patents is typically only useful for protecting the interior of a car from inclement weather conditions. Such gaskets do not provide adequate sealing in high pressure or high temperature environments, suffer the infirmity of advanced degradation of the soft tubular material which provides the seal, and therefore provide inadequate sealing once the seal ages in any significant manner. Thus, the aforementioned weather strips do not satisfy long-felt needs in the art for adequate gasket and sealing arrangements which economically and efficiently attach to a surface defining an interior structure which must be sealed.

As can be seen from the above-referenced weather strips, it is necessary to provide an attachment mechanism to the weather strip so that it can permanently seal the surfaces. To this end, prior clips and fastening devices for use in securing rubber weather seals and gaskets to doors have been utilized. In general, these fastening devices are embedded in a material such as plastic and consist of head and leg portions which may be formed from a single piece of wire. See, e.g., Scott U.S. Pat. No. 2,643,433, at col. 3, lines 38–43. The head portion is engaged with a metal piece in the surface while the wire shank or legs are inserted through an opening in, for example, an automobile body. See Scott at col. 3, lines 55–61. Individual fasteners with wire shanks and legs may have various shapes and may connect rubber gaskets to oven doors through a flange. See, e.g., Saponara U.S. Pat. No. 2,988,788, at col. 1, lines 12–17; Fessler U.S. Pat. No. 2,139,329, at col. 1, lines 42–46.

Other Various shapes and arrangements of clips or fasteners have been devised as attachment mechanisms for gaskets. Attaching clips may be looped out of wire to be engagable with a coil spring member in a weather strip and can comprise a base divided into two portions to provide a torsional action which holds a gasket in the door of a car in a firm manner. See, e.g., Berwanger U.S. Pat. No. 3,167,824, and Sarafinas U.S. Pat. No. 3,059,299. Individual fasteners may also consist of simple bent wire clips, or more complex tabs that project upwardly and which are deformable for grabbing the periphery of a sealing member which will adhere to a surface. See Crampton U.S. Pat. No. 2,867,464, and DeCore et al U.S. Pat. No. 4,783,087.

Thus, prior attachment mechanisms for sealing weather strips and gaskets to surfaces are usually provided in multiple fashion and attach individually to a gasket so that it can be clipped to a surface which the gasket is intended to seal. However, this arrangement is extremely costly since a large number of individual fasteners must be provided to the gasket in order to effect adequate sealing of the surface and the clips are not usually optimally placed on the gasket to provide effective sealing of the gasket to the surface. Prior individual clips are therefore not economical and fail to solve a long-felt need in the art for an economic and efficient device to provide attachment of a sealing gasket to a surface.

In efforts to ensure that sealing gaskets are adequately fastened to surfaces, prior clips have been integrally attached to springs and frames, or molded from a single piece of wire. See, e.g., Watzl et al. U.S. Pat. No. 3,167,826, col. 2, lines 27–31. This type of sealing gasket may be reinforced with a sinuous wire which is bent into a zigzag corrugated shape to provide snap fastener projections which are spaced lengthwise of the sealing strip and which conform to the shape of the door which the gasket will seal. See, e.g., Milne U.S. Pat. No. 2,938,249, at col. 2, lines 28–34; Harris U.S. Pat. No. 2,579,072, at col 3, lines 25–29.

Similarly, prior sealing gaskets for use with oven doors may be bendable into a rectangular shape and have a wire that is simultaneously drawn through the base of the gasket while the gasket is being extruded. In such an arrangement, resilient metal clips are used to grip a base and extend to apertures to secure the gasket to the oven. See Vogel U.S. Pat. No. 4,538,381, at col. 2, lines 23–44. However, none of the aforementioned gaskets which are adapted to seal the space between surfaces provide adequate rigidity and structure to the gasket to ensure a good seal, or reduce the number of integrally formed clips to hold the gasket against one of the surfaces. Thus, the above-mentioned gaskets and seals are not economical and are difficult to implement.

Other arrangements for sealing ovens and oven doors are disclosed in Marchand French Pat. No. 2,491,120. The Marchand patent teaches a tubular braid having a metal wire inserted therein. Connection mountings are inserted into the holes of an oven door and have curved members with a free end and a sharp border. The free end with the sharp border pierces a glass tubular fitting during the mounting process and engages the metal wire at a curved portion of the mounting. In operation of the connections disclosed in the Marchand patent, the connections are first mounted to an oven door and then pierce the tubular fitting to make connection with the wire inserted therein to cause the tubular fitting to provide a watertight seal between a watertight surface and the oven door. However, the apparatus disclosed in the Marchand patent fails to reduce the number of required clips to seal the tubular member to the door. Furthermore, the connections disclosed in the Marchand patent are not radially rigid and so are not adapted for efficient insertion into the openings. In fact, it is believed that the use of the wire insert disclosed in Marchand provides an undesirable "hinge" effect for the connections causing the connections to swivel around the wire, thereby degrading the stability of the connections, reducing the tendency of the connections to remain radially rigid in a plane containing the connections, and making it difficult to mount the gasket to a surface to be sealed. Thus, the prior weather seals, gaskets, and sealing strips described above fail to fulfill long-felt needs in the art for rigid gaskets to seal the space between two surfaces having clips which are adapted to provide an efficient interface of the gasket with a surface to be sealed.

Woven tubular gaskets with continuous integral attachments are known to provide sealing of a space between two surfaces. See, e.g., Moyer et al U.S. Pat. No. 4,822,060. The Moyer et al. patent teaches a woven tubular gasket having a continuous integral attachment which is contained within the woven tubular gasket and which has protrusions which extend through or are extendable through the walls of the woven tubular gasket to engage openings in a substrate. See Moyer et al., col. 2, lines 9–18. The protrusions are adapted to snap into the openings of a surface and the attachment also contains zigzag portions which line up substantially perpendicular to the plane of the protrusions to provide lateral stability for the woven tubular gaskets. See Moyer et al., col. 8, lines 33–53.

While the Moyer et al. patent teaches oven gaskets which partially solve the aforementioned long-felt needs, gaskets and clips provided in accordance with the present invention more readily solve these long-felt needs as will be understood by those with skill in the art with reference to the following detailed description read in conjunction with the accompanying drawings.

SUMMARY OF THE INVENTION

Gaskets and sealing members provided in accordance with the present invention solve the aforementioned long-felt needs and greatly improve the efficiency and economy of producing gaskets described herein. Clips provided in accordance with the present invention may be optimally placed on the gasket, thereby reducing the number of clips required to secure the gasket to the surface and significantly reducing oven finishing time. Such results have not heretofore been achieved in the art and evince significant advantages over prior methods and devices for securing gaskets to surfaces for sealing. In a preferred embodiment, a clip for securing an oven gasket to a surface on an oven comprises shoulder means for interfacing to the surface on the oven and securing the oven gasket to the surface, first retaining means integrally formed on a first side of the shoulder means for fixedly retaining the clip to the oven gasket, and second retaining means integrally formed on a second side of the shoulder means for further fixedly retaining the clip to the oven gasket.

Methods provided in accordance with the invention similarly produce economical oven gaskets which allow for easy and efficient installation to an oven for sealing. In a preferred embodiment, a method of manufacturing an oven gasket to seal a space between two surfaces comprises the steps of knitting a tubular bulb having a first radius to provide resilient support to the gasket, braiding a tubular resilient sealing member with a second radius greater than the first radius around the knitted bulb to provide a resilient seal between the two surfaces when the gasket is placed therebetween, piercing the braided sealing member with a plurality of clip members which will secure the gasket to one of the two surfaces, and securing the clip members to the gasket.

With clips provided in accordance with the invention, gaskets can be constructed wherein the clips are variably spaced along the gasket. This provides the advantageous result not heretofore realized by prior gaskets of optimizing the clip spacing along the gasket to improve overall performance and aesthetics, as well as potentially reducing the required number of clips to secure the gasket to the surface. The above-referenced advantages of the invention and the solution to the long-felt needs will be better understood by the following detailed description of the invention with reference to the drawings.

BRIEF DESCRIPTION OF THE DRAWINGS

FIG. 1 is a plan view of a clip provided in accordance with the present invention for securing a gasket to a surface.

FIG. 3 is a woven tubular gasket having staple clips in accordance with the invention which provide radial rigidity to the gasket.

FIG. 4 illustrates woven tubular gaskets provided in accordance with the present invention for sealing the space between an oven and oven door in a self-cleaning oven.

DETAILED DESCRIPTION OF PREFERRED EMBODIMENTS

Figure 2A:
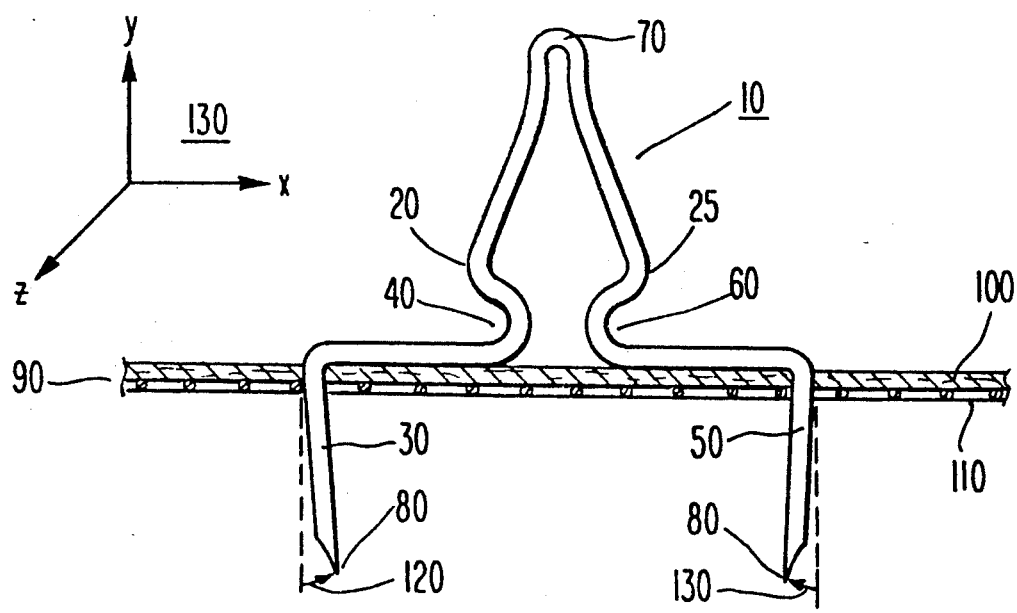
FIGS. 2A–2C illustrate how the clip of FIG. 1 is secured to gaskets provided in accordance with the present invention.

Referring now to the drawings wherein like reference numerals refer to like elements and by way of example only without intending to limit the invention disclosed herein in any way, FIG. 1 shows a clip 10 for securing a sealing member to a surface. In a preferred embodiment, clip 10 is provided with shoulder means comprising a first shoulder member, shown at 20, which interfaces the clip to the surface so that clip 10 secures the sealing member to the surface. The clip further comprises a first retaining member 30 integrally formed on a first side 40 of the first shoulder 20 for retaining clip 10 fixedly to the sealing member. Similarly, the shoulder means preferably further comprises a second shoulder member 25 oppositely extended from the first shoulder member 20. A second retaining member 50 is integrally formed on a second side 60 of the shoulder member 25 and further fixedly retains the clip to the sealing member.

It will be recognized by those with skill in the art that clip 10 is adaptable for use in an oven gasket which would seal a space between an oven and an oven door. When clip 10 is used with such an oven gasket, it is fashioned of a high temperature resistant metal material adapted to operate in the harsh environment found, for example, in a self-cleaning oven where the gasket seals the space between the oven door and the oven especially during the cleaning operation. Stainless steel has been found to be such a useful high temperature resistant metal. The head of the clip, shown generally at 70, is adapted to interface through a hole in the oven door while the first and second retaining members 30 and 50 grasp the gasket, thereby securing the gasket to the oven door so that a strong and resilient seal is made between the oven and the oven door by the gasket, especially during the self-cleaning operation.

In a further preferred embodiment, the first and second retaining members terminate in two staple ends 80 which are integrally formed on the first and second sides of the shoulder members 40 and 60. The staple ends 80 are adapted to pierce the sealing member so that the clip 10 can be secured thereto. Referring to FIG. 2A, clip 10 is inserted through an oven gasket 90 so that the gasket can be secured to a surface. The staple ends 80 pierce the gasket 90 so that clip 10 securely grasps the gasket. Gasket 90 generally comprises a sealing member which is adapted to provide a resilient seal between, for example, an oven door and an oven when the gasket is secured therebetween. In a further preferred embodiment, the gasket 90 comprises a tubular braided member 100 which provides the resilient seal between the two surfaces, and a resilient tubular support member 110 which provides support to the gasket. In still further preferred embodiments, the braided sealing member 100 comprises braided fiberglass which is optimally braided to provide efficient sealing, and the resilient support member comprises a knitted wire bulb adapted to provide resilient support to the gasket. Such an arrangement is often described as a "woven tubular gasket" and is substantially described in the aforementioned Moyer et al. U.S. Pat. No. 4,822,060, the teachings of which are specifically incorporated herein by reference.

In yet a further preferred embodiment of gasket clips provided in accordance with the present invention, first and second retaining members 30 and 50 terminating in the staple ends 80 are formed at angles 120 and 130 with respect to the vertical so that the staple ends of clip 10 can be efficiently crimped to the gasket after the staple ends pierce gasket 90 to be secured thereto. Forming the first and second retaining members 30 and 50 having staple ends 80 at angles 120 and 130, respectively, allows the retaining members to be efficiently manipulated during the staple crimping procedure. It is preferable to fashion staple ends 80 at angles 120 and 130 since clips 10 will normally be fashioned from a material having a higher flexural modulus than materials comprising common "office-type" staples. Thus, it is necessary to begin the deflection of the staple ends 80 at angles 120 and 130 in order to ensure adequate crimping. Additionally, the wire diameter of the stainless steel clips 10 is preferably 0.025 inches which is heavier than the diameter of common staple wire, thereby requiring a start of the deflection of the staple ends 80 in order to obtain efficient crimping. It has been determined that angles 120 and 130 provide optimum crimping and manipulation of the retaining members 30 and 50 when angles 120 and 130 are at about 3° to the normal. However, it will be recognized by those with skill in the art that if a sufficiently hard anvil surface is used to crimp the staple ends, angles 120 and 130 may be less than 3° and indeed, may approach 0°.

Figure 2B:
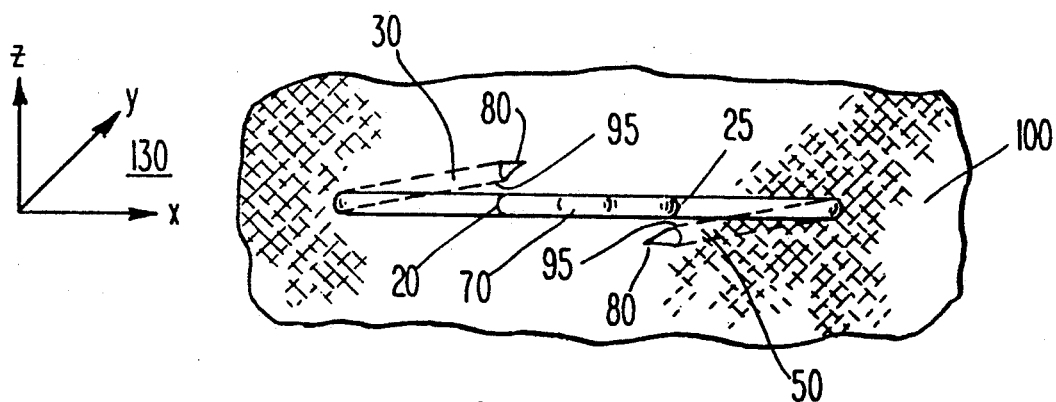

FIG. 2B illustrates clip 10 when retaining members 30 and 50 are preferably bent to secure the gasket 90 after the staple ends have pierced through braided tubular sleeve 100 and knitted wire bulb 110. It will be recognized that retaining members 30 and 50 may only pierce the braided fiberglass sleeve 100 but not knitted wire bulb 110 and then be bent into the position shown in FIG. 2B so that clip 10 can be secured to the gasket. It is more preferred, however, that retaining members 30 and 50 terminating in staple ends 80 pierce both the braided fiberglass sleeve 100 and knitted wire bulb 110 to be bent into the position shown in FIG. 2B for securing the clip to the gasket 90. Either piercing arrangement and equivalents thereof are intended to be within the scope of the present invention.

Figure 2C:
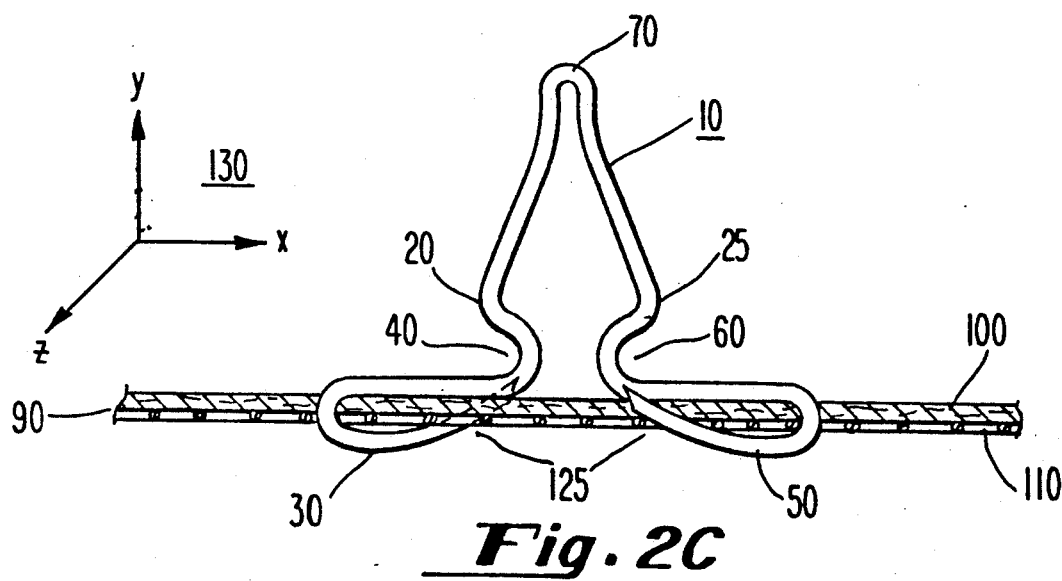

Referring now to FIG. 2C, the retaining members 30 and 50 with staple ends 80 are bent back on each other as shown so that the staple ends 80 repierce the knitted wire bulb 110 at points 125. Preferably, the staple ends then traverse through the braided fiberglass so that the retaining members or legs 30 and 50 cinch to gasket 90 at crimp angles 95, as best seen in FIG. 2B, thereby fixedly retaining clip 10 to gasket 90. A plurality of clips 10 can be so affixed to gasket 90 and are spaced to interface with a plurality of reciprocal openings in an oven or oven door so that gasket 90 can be optimally secured thereto for sealing. Preferably, the staple ends are crimped at crimp angles 95 so that radial rigidity is provided to the clip when it cinches to the gasket. As used throughout this specification, the term "radial rigidity" means that the clips 10 are substantially stiff when cinched or crimped to the gasket, and are not susceptible of substantial motion outside of a plane containing the clips when they are cinched to the gasket. In this fashion the clips 10 will "stand up" on the gasket so that they are easily aligned with the spaced openings in the oven or oven door, thereby allowing the gasket to be quickly and efficiently fitted and secured to the oven. The crimp angles 95 are preferably arranged so that first retaining member 30 is at least 15° with respect to the front of the x-y plane 135 of clips 10 and second retaining member 50 is at least 15° with respect to the back of the x-y plane 135 of clips 10 to provide radial rigidity of the clips in the x-y plane. In order to achieve efficient radial rigidity of the clips 10 in the x-y plane, it is further preferred that first retaining member 30 and second retaining member 50 are kept substantially parallel to each other when crimped to the gasket.

Gaskets provided in accordance with the present invention for use during the high temperature, self-cleaning oven process are generally woven tubular gaskets such as the exemplary gasket shown in FIG. 3. As shown in FIG. 3, the knitted wire bulb 110 of gasket 90 is cylindrical or tubular in shape and has a first radius. Cylindrical knitted wire bulb 110 preferably provides resilient support to the gasket. The sealing member 100 is further preferably a cylindrical or tubular braided fiberglass sealing member having a second radius which is larger than the first radius such that the braided fiberglass sealing member 100 fits securely around the knitted wire bulb 110.

In a high temperature environment, it is advantageous to staple clips 10 to the gasket because stapling eliminates the need for welding or cementing clips to the gasket wherein the cemented or welded seal could degrade over extended time exposure to the intense heat of the self-cleaning process in an oven. Furthermore, the clips disclosed herein allow gaskets to be constructed wherein the clips may be variably spaced on the gasket according to any particularly desired arrangement for interfacing to a surface. This allows gaskets provided in accordance with the invention to have optimal clip spacing and will enhance the gasket's fit to a surface, thereby improving both performance and aesthetics. These advantageous features and results have not heretofore been achieved, and solve long-felt needs in the art for efficient and economical oven gaskets for use in self-cleaning ovens.

Woven tubular gaskets provided in accordance with the present invention are particularly useful to seal the space between ovens and oven doors as shown in FIG. 4. Oven 140 is generally a self-cleaning oven, however gaskets described herein could easily be used to seal the space between other types of ovens and oven doors. The oven door 150 has holes 160 drilled therethrough such that clips 10 interface to the oven door through the holes and securely retain the gasket to the oven door so that a sealing arrangement is accomplished between the oven door 150 and the oven 140 when the oven door is closed. Clips 10 which are stapled through the gasket can be strategically and optimally located on the gasket to reduce the number of clips necessary to fixedly secure the gasket 90 to the oven door 150 through holes 160.

In construction of self-cleaning ovens as described herein, a baked enamel surface is usually applied to the oven and oven door after the holes are drilled therethrough to finish the oven with an attractive and functional surface. However, the baked enamel inevitably fouls holes 160 and must be cleaned from the holes before the oven gasket 90 can be fitted on the oven. With gaskets provided in accordance with the present invention having clips 10 strategically and optimally located on the gasket, a fewer number of holes 160 need to be reciprocally drilled in oven door 150, thereby reducing the need to clean the baked enamel deposits in holes 160 after oven finishing and greatly improving the efficiency of the oven manufacturing process. This advantageous result has not heretofore been achieved in the oven gasket art and greatly increases the efficiency of constructing self-cleaning and other ovens.

There have thus been described certain preferred embodiments of oven gaskets for sealing the space between two surfaces. While preferred embodiments have been described and disclosed, it will be recognized by those with skill in the art that modifications are within the true spirit and scope of the invention. The appended claims are intended to cover all such modifications.

What is claimed is:

1. An oven gasket for sealing a space between two surfaces comprising:
   tubular bulb means for providing resilient support to the gasket, the tubular bulb means having a first radius;
   tubular resilient sealing means disposed around the tubular bulb means for providing a resilient seal between the two surfaces when the gasket is placed therebetween, the tubular resilient sealing means having a second radius larger than the first radius; and
   a plurality of individual clips secured to the gasket through the tubular resilient sealing means for securing the gasket to one of the surfaces, the individual clips further comprising shoulder means for interfacing with one of the two surfaces and securing the gasket to one of the two surfaces,
   first retaining means integrally formed on a first side of the shoulder means for fixedly retaining the clips to the gasket, and
   second retaining means integrally formed on a second side of the shoulder means for further fixedly retaining the clip to the gasket, the first and second retaining means each being further adapted to be bent substantially parallel to each other so as to provide radial rigidity to the clip when the clip is fixed to the gasket.

2. The gasket recited in claim 1 wherein the clips further comprise:
   first staple means integrally formed on the first retaining means, the first staple means adapted to pierce the tubular resilient sealing means so that the clips securedly grasp the gasket; and
   second staple means integrally formed on the second retaining means, the second staple means adapted to pierce the tubular resilient sealing means so that the clip further securedly grasps the gasket, whereby when the first and second staple means pierce the tubular resilient sealing means, the clip is fixedly secured to the gasket so that the gasket can provide a seal between the two surfaces.

3. The gasket recited in claim 2 wherein the first and second retaining means are formed on the shoulder means at an angle with respect to a vertical so that the clips can be efficiently manipulated to securely fasten to the gasket after the first and second staple means have pierced the tubular resilient sealing means.

4. The gasket recited in claim 3 wherein the angle with respect to the vertical is at 3° normal.

5. The gasket recited in claim 4 wherein the first and second staple means are crimped to the gasket at a crimp angle with respect to a plane substantially containing the clips to provide radial rigidity to the clips.

6. The gasket recited in claim 5 wherein the crimp angle is at least 15° with respect to the plane of the clips.

7. A method of manufacturing an oven gasket to seal a space between two surfaces comprising the steps of:
   knitting a tubular bulb having a first radius to provide resilient support to the gasket;
   braiding a tubular resilient sealing member with a second radius greater than the first radius around the knitted tubular bulb to provide a resilient seal between the two surfaces when the gasket is placed therebetween;
   piercing the braided sealing member with a plurality of clip members which will secure the gasket to one of the two surfaces; and
   securing the clip members to the gasket, wherein each clip member comprises shoulder means for interfacing to one of the two surfaces and securing the gasket to one of the two surfaces,
   first retaining means integrally formed on a first side of the shoulder means for fixedly retaining the clip to the gasket, and
   second retaining means integrally formed on a second side of the shoulder means for further fixedly retaining the clip member to the gasket, the first and second retaining means each being further adapted to be bent substantially parallel to each other so as to provide radial rigidity to the clip when the clip is secured to the gasket.

8. The method recited in claim 7 wherein the clip members further comprise:

first staple means formed on the first retaining means for piercing the tubular sealing member so that the clip members securedly grasp the gasket; and second staple means formed on the second retaining means for piercing the tubular sealing member so that the clip members further securedly grasp the gasket such that when the first and second staple means pierce the tubular sealing member the clip members will fixedly secure to the gasket so that the gasket can provide a seal between the two surfaces.

9. The method recited in claim 8 wherein the securing step comprises crimping the first and second staple means to the gasket at a crimp angle with respect to a plane containing the clip members to provide radial rigidity to the clip members.

10. The method recited in claim 9 wherein the crimp angle is at least 15° with respect to the plane of the clip members.

11. The method recited in claim 10 wherein the first and second retaining means are formed at an angle with respect to a vertical so that the first and second staple means efficiently pierce the tubular resilient sealing member.

12. The method recited in claim 11 wherein the angle with respect to the vertical is at 3° to the normal.

13. The method recited in claim 12 wherein the clip members comprise high temperature resistant metal which is malleable such that the first and second staple means can be bent to fixedly secure the clip members to the gasket.

* * * * *